A. CARPENTER.
TRACTION WHEEL.
APPLICATION FILED APR. 5, 1917.

1,276,173.

Patented Aug. 20, 1918.
3 SHEETS—SHEET 1.

Witnesses,
Edward T. Wray

Inventor.
Alexander Carpenter.
by Parker Carter
Attorneys.

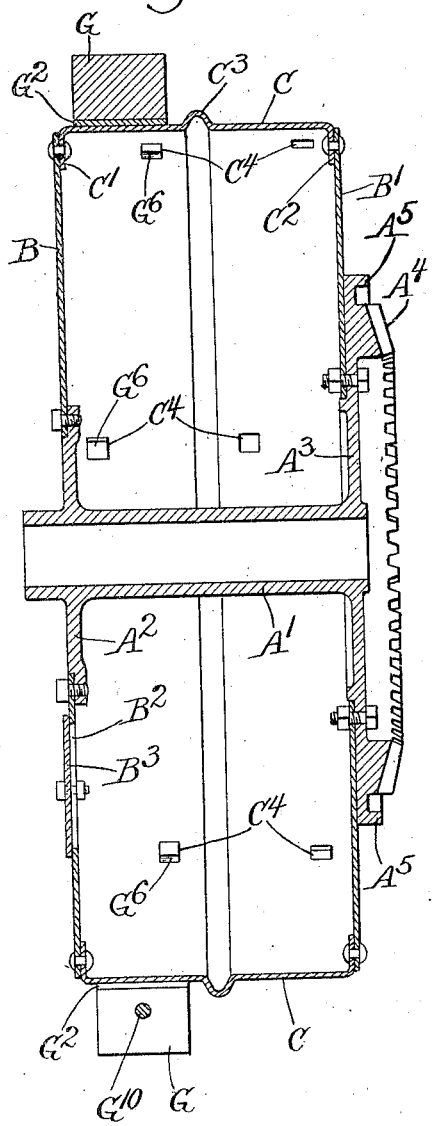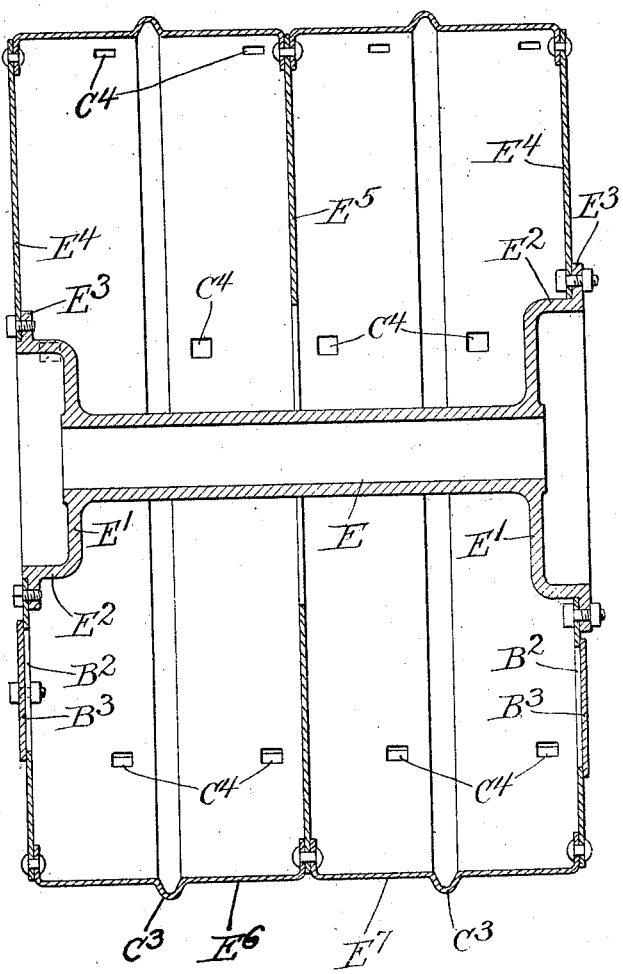

A. CARPENTER.
TRACTION WHEEL.
APPLICATION FILED APR. 5, 1917.
1,276,173.
Patented Aug. 20, 1918.
3 SHEETS—SHEET 3.
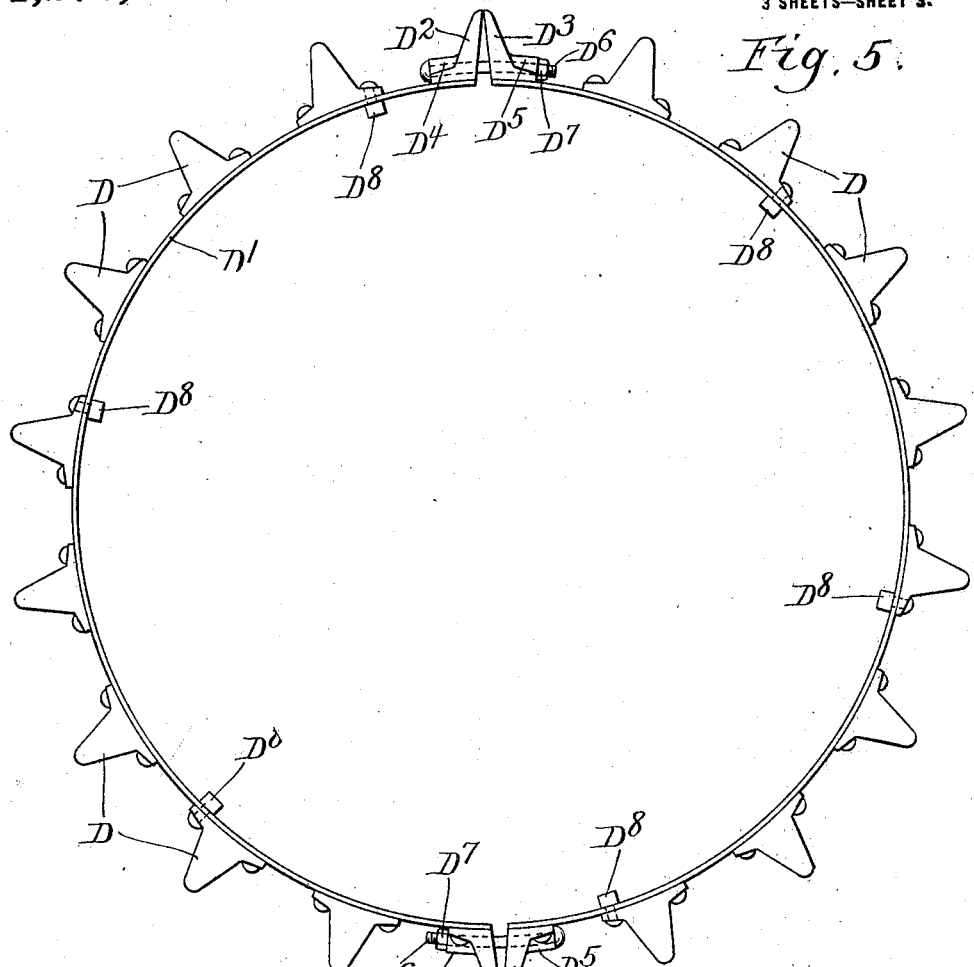
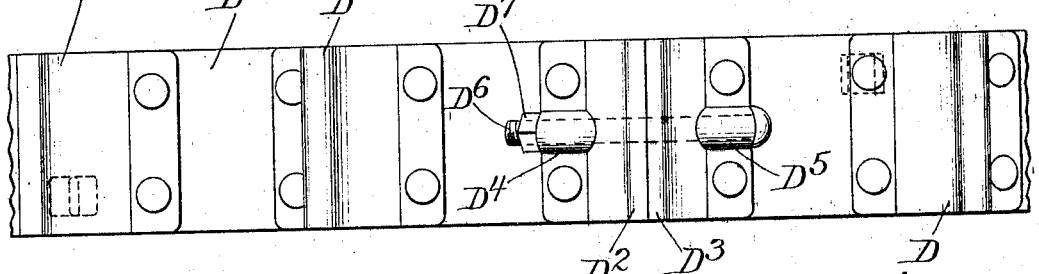
Witnesses.
Edward T. Wray.
Inventor.
Alexander Carpenter.
by Parker & Carter
Attorneys.

UNITED STATES PATENT OFFICE.

ALEXANDER CARPENTER, OF CAREY, OHIO, ASSIGNOR TO NATIONAL TRACTOR & PLOW COMPANY, OF CAREY, OHIO, A CORPORATION OF OHIO.

TRACTION-WHEEL.

1,276,173.  Specification of Letters Patent.  Patented Aug. 20, 1918.

Application filed April 5, 1917. Serial No. 159,889.

*To all whom it may concern:*

Be it known that I, ALEXANDER CARPENTER, a citizen of the United States, residing at Carey, in the county of Wyandot and State of Ohio, have invented a certain new and useful Improvement in Traction-Wheels, of which the following is a specification.

My invention relates to improvements in traction wheels, and has for one object to provide a new and improved form of traction wheel for motor vehicles and the like. One of the objects of my invention is to provide a wheel which will be light, durable, easily and conveniently made, and which will be easily and conveniently cleaned. Another object is to provide a wheel which does not sink deeply into loose and muddy soil, and which does not carry dirt with it. Another object is to provide a wheel which will have a minimum resistance to rotation when mired in. Another object is to provide a removable non-skid device for such a wheel, whereby the wheel may be used for improved roads, or provided with a non-skid device for slippery, muddy conditions. Other objects will appear from time to time in the specification.

My invention is illustrated more or less diagrammatically in the accompanying drawings, wherein—

Fig. 3 shows a section through my wheel and illustrates the non-skid device applied thereto;

Fig. 4 shows a section through a built up wheel embodying my invention;

Fig. 5 shows a side elevation showing a different form of non-skid device;

Fig. 6 is a plan of a portion of Fig. 5.

Like parts are indicated by like letters in all the figures.

Figure 1:
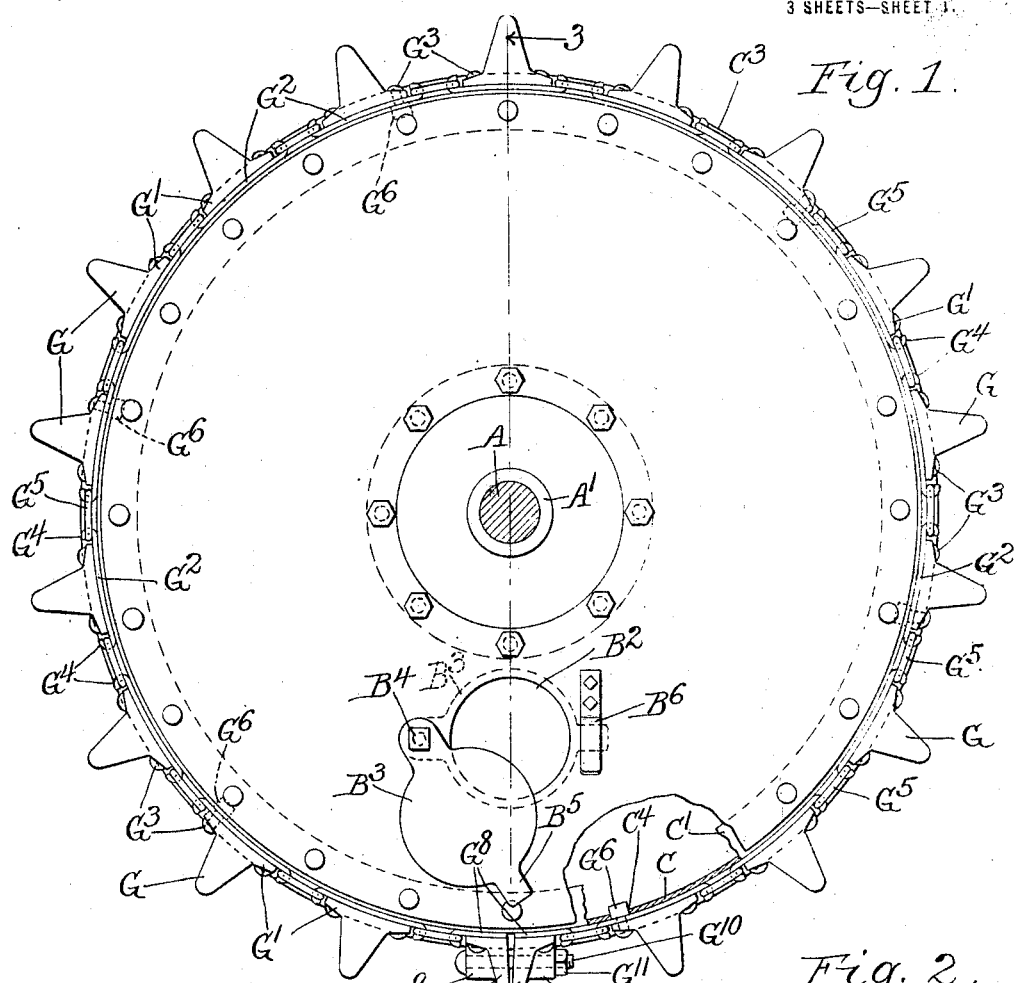
Figure 1 shows a side elevation of my wheel, parts in section and parts omitted with one form of non-skid device applied thereto.
Figure 2:
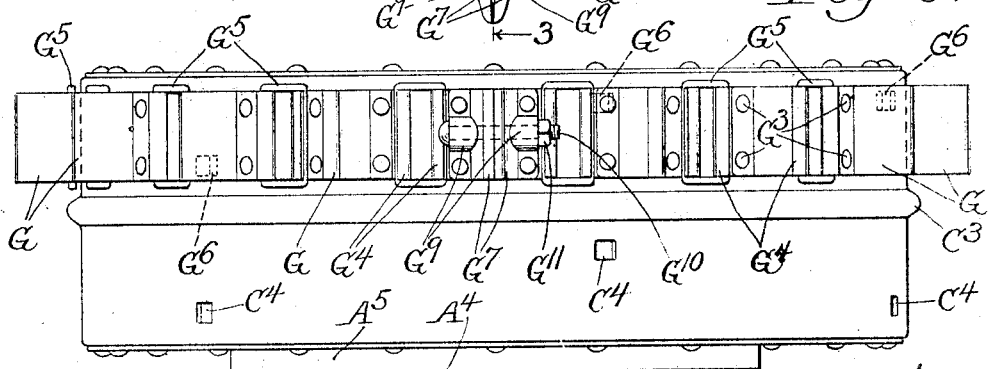
Fig. 2 shows a plan view of the wheel only, one side of the wheel having the non-skid device, the other having it removed.

A is a vehicle axle. Upon it is rotatably mounted a vehicle hub $A^1$. This hub takes the form of a sleeve and is provided at one end with an integral flange $A^2$ and at the other end a larger flange $A^3$, upon which in the preferred form is provided a miter gear $A^4$. $A^5$ is merely a flange to coöperate with the dust guard not here shown or illustrated.

The wheel proper which is mounted on the hub just described consists of two annular flat metallic plates B, $B^1$. They are bolted respectively to the flanges $A^2$, $A^3$ and are provided with hand holes $B^2$ whereby the operator may have access to the interior of the wheel if that be necessary. The hand holes are closed by covers $B^3$ which covers are rotatably mounted on pins $B^4$ and have handles $B^5$ adapted to engage snap spring fingers $B^6$ on the plate so that the hand hole covers may be yieldingly held in the closed position to prevent the entrance of foreign matter into the interior of the drum forming the wheel.

C is the tread of the wheel. It is an annular ring flanged on both sides as at $C^1$, $C^2$, and these flanges are riveted to the outer peripheries of the plates B, $B^1$. It will be noted that the central portion of the drum is slightly higher than the outer sides, so that even if the rib $C^3$ were omitted, the pressure on the outer edges of the tread surface would be when on a hard road slightly less than at the center, thus making steering easy, because the wheel can turn easier. The flange or rib $C^3$ extends about the periphery of the wheel and divides it into two separate zones, and when on a very hard road it furnishes the sole supporting surface. It also prevents side slipping or skidding of the device. This tread member is provided with a series of staggered rectangular perforations $C^4$, though it will be obvious that these perforations might be round or any other shape suiting the fancy of the constructor.

The non-skid device is made up of a series of wedge-shaped blocks D, preferably of cast iron. They extend substantially across half the width of the tread surface of the wheel, and are riveted to a spring band $D^1$ of steel or other suitable material adapted to conform to the contour of the wheel. This band is made of two parts, and at either end of each band the rib members D are separated in two half sections $D^2$, $D^3$, at the faces of which are hollow lugs $D^4$, $D^5$ through which pass a holding bolt $D^6$, coöperating with a nut D⁷ so that the band may be drawn tight up on the wheel. At certain points about the periphery of the band are provided rivet heads D⁸. These rivet heads are large and not cut off so that they may engage the perforations C⁴ in the periphery of the wheel, and so coöperate one with another to hold the non-skid band against movement with respect to the wheel either in a longitudinal or a transverse direction.

Referring now to the slightly modified form shown in Fig. 4, E is an elongated hub, having a flange E¹, E¹ at either end. This flange is provided with an outwardly extending collar E², flanged as at E³ to engage side plates E⁴. E⁵ is a central similar side plate. These three side plates coöperate with two tread ring members E⁶, E⁷, so that when the parts are riveted together and bolted to the hub a single broad wheel is formed having substantially twice the width of the wheel shown in Fig. 3. This merely illustrates one way in which broad wheels can be put together. It will be obvious that two wheels like Fig. 3 might be put side by side and if this were done, the bolts and rivets might or might not be passed clear through, or the wheels might be held together merely by a single hub or by bolting the hubs together, or by drawing the hub together by means of nuts screw-threaded on the axle shaft. In other words, one of these sections or two of them or more may be assembled as shown or in any obvious way for the purpose of providing an increased width of wheel when that becomes desirable.

I will now describe the preferred form of non-skid device. It is made up of a series of separate wedge-shaped grouters or gripping members G, G. These members have extended flanges G¹ on either side thereof and extend in width substantially across one half the tread surface of the wheel. They rest upon thin metal supporting plates or strips G², being held in position by rivets G³ passing through such strips and through the flanges G¹. These strips are bent back at either end to provide hooks G⁴, G⁴, which hooks are joined together in opposition one to another by links G⁵, the parts being so arranged that they all conform snugly to the contour of the wheel. Occasional rivets are provided on the inside with enlarged heads G⁶ adapted to engage the perforations C⁴ in the tread of the wheel, and by linking these parts together as indicated, a single continuous chain is formed, and this chain infolds the wheel. At the two ends of the chain the sections G are dispensed with and two segmental parts G⁷, G⁷ are provided. They are each at the end of two short plate sections G⁸, G⁸, and are apertured and provided with lugs G⁹, G⁹ through which pass a holding bolt G¹⁰ with nut G¹¹, whereby the chain may be tightened on the wheel to hold it in position, it being held against movement either around the wheel or across the face by the enlarged rivet heads which engage the perforation in the tread.

It will be evident that while I have shown in my drawings an operative device, still many changes might be made both in size, shape and arrangement of parts without departing materially from the spirit of my invention. I wish, therefore, that my drawings be regarded as in a sense diagrammatic.

The use and operation of my invention are as follows:—

The tractor wheel which I have provided may be used for a drive wheel for a traction engine, or it may be used for a trailer wheel, or it may be used for any other purpose where a traction wheel is desirable. It is of course of a rigid, heavy, durable type used in connection with very heavy wagons or trucks or more preferably with farm tractors and the like.

Such tractors, of course, are likely to sink in to a soft soil, and when they do the soft soil, mud and the like, will flow in around the edge of the wheel, if it is a flat, ordinary type of wheel, and will tend to make it difficult to turn the wheel. My drum structure provides what is in effect a float, and when the wheel sinks in it displaces a certain amount of the road or supporting surface, and thereby exerts energy to lift it up. This of course is but very slight, but it is sufficient, in connection with the smooth side of the wheel, to prevent miring in of my wheel where an ordinary flat wheel would be mired in.

The wheel is built up as indicated out of two flat annular plates tied together by a hub and supporting between their peripheries a rolled tread plate which is of greater diameter at its center than at its edges, so as to make a wheel substantially the shape of the ordinary belt pulley, which of course being deeper at the center tread is easier turned than it would be were it flat. The flanges on the rolled tread portion are rolled in and riveted to the side plate so as to make a rigid, durable structure. The central rib rolled in the tread plates divides the tread surface into full zones, and provides a thin line contact for use on a hard road, such as macadam, gravel, stone or the like.

The perforations arranged occasionally about the periphery of the wheel, of course, are so small, that little if any of the road material gets in and any that does get in will have an ample chance to work its way out through them again. These perforations are provided for the purpose of anchoring the non-skid device.

The non-skid device may take a number of different forms. It is necessary that it be removable. It is necessary that it be easily stored or carried in the vehicle, because as the tractor moves from place to place it sometimes travels over a road where it must have a non-skid device and again travels over a road where the law will not allow it to have it.

The non-skid chain which I have provided is held on the periphery of the wheel by the tension in it and this tension is developed by the nut and bolt arrangement at the end of the chain. The chain may be taken off and dropped in the tool box by merely releasing the bolt so as to permit the end to swing away to free the enlarged rivet heads from their engagement with the holes in the periphery of the tread. When these tread members engage the ground or when there is any pulling tendency on them, there is a tendency for them to rotate around their base. Since the base is broad, however, and since the tension in the chain is great, they cannot do this and so they sink into the ground and accomplish their purpose.

In a modified form a spring ring is provided and the cleats or grouters are riveted directly to the spring ring. In this case two segments are used and these two sections are bolted together and tightened. The strength of the spring ring itself in this case coöperates with the tension in the ring to prevent tipping over of the grouters, though it must be borne in mind that owing to their broad base the tendency to tip is but slight.

I claim:

1. The combination with a vehicle wheel of a non-skid device comprising a flat flexible ring adapted to surround the wheel, grouters rigidly mounted on the ring, means for tightening the ring, comprising a segmental grouter at each end of the ring and means for drawing the two parts of such grouter together to tighten the ring, the outer extremities of the two grouter parts being adapted to engage one another when the ring is tight.

2. The combination with a vehicle wheel of a non-skid device comprising a flat flexible ring adapted to surround the wheel, grouters rigidly mounted on the ring, means for tightening the ring, and means for preventing movement of the ring with respect to the wheel comprising lugs beneath the grouters rigidly mounted on the ring adapted to penetrate the tread surface of the wheel, the tread of the wheel having perforations of the same shape as the said lugs and loosely engaging them.

3. A non-skid device for traction wheels comprising a flexible ring adapted to surround the wheel, grouters mounted on the ring and means for holding the ring in position on the wheel, the ring being made up of a series of separate thin base link members, open links connecting them, the grouters being connected to the base members and not to the open links.

4. A non-skid device for traction wheels comprising a flexible ring adapted to surround the wheel, grouters mounted on the ring and means for holding the ring in position on the wheel, the ring being made up of a series of separate thin base link members, open links connecting them, the grouters being connected to the base members and not to the open links, the means for holding the ring against movement with respect to the wheel comprising lugs projecting downwardly from said grouters through said base members and penetrating the wheel.

In testimony whereof, I affix my signature in the presence of two witnesses this 23rd day of March, 1917.

ALEXANDER CARPENTER.

Witnesses:
  GEO. J. NEWHARD,
  C. G. SPENCER.